(12) United States Patent
Allen et al.

(10) Patent No.: US 8,372,531 B1
(45) Date of Patent: Feb. 12, 2013

(54) RESERVE BATTERY SYSTEM

(75) Inventors: Fred Allen, Princeton Junction, NJ (US); Eran Turi, Richboro, PA (US)

(73) Assignee: Mphase Technologies, Inc., Little Falls, NJ (US)

( * ) Notice: Subject to any disclaimer, the term of this patent is extended or adjusted under 35 U.S.C. 154(b) by 372 days.

(21) Appl. No.: 12/715,608

(22) Filed: Mar. 2, 2010

(51) Int. Cl.
*H01M 6/36* (2006.01)
*H01M 6/38* (2006.01)

(52) U.S. Cl. ......... 429/116; 429/113; 429/114; 429/117

(58) Field of Classification Search .................. 429/110, 429/113, 114, 116, 117
See application file for complete search history.

(56) References Cited

U.S. PATENT DOCUMENTS

| | | |
|---|---|---|
| 711,537 A | 10/1902 | Sedgwick |
| 1,506,302 A | 8/1924 | Hopkins |
| 2,832,814 A | 4/1958 | Shannon |
| 3,053,928 A | 9/1962 | Hopkins |
| RE25,913 E | 11/1965 | Robertson |
| 3,236,697 A | 2/1966 | Amlet |
| 3,486,944 A | 12/1969 | O'Donnell |
| 3,514,339 A | 5/1970 | Powers |
| 3,653,973 A * | 4/1972 | Broglid ......................... 429/116 |
| 3,665,178 A | 5/1972 | Sussinham |
| 3,712,834 A | 1/1973 | Doe |
| 3,716,708 A | 2/1973 | Kaye |
| 3,825,446 A * | 7/1974 | Oka .............................. 429/116 |
| 3,827,914 A | 8/1974 | Kaye |
| 3,865,631 A | 2/1975 | Clayman |
| 3,929,507 A | 12/1975 | Bro et al. |
| 3,930,885 A | 1/1976 | Dey |
| 4,031,296 A | 6/1977 | Sarbacher |
| 4,433,036 A | 2/1984 | Horning |
| 4,446,211 A | 5/1984 | Goebel |
| 4,477,543 A | 10/1984 | Bjorklund |
| 4,605,604 A * | 8/1986 | Pollack et al. ................ 429/116 |
| 4,628,014 A | 12/1986 | Hruden |
| 4,695,520 A | 9/1987 | Koper |
| 4,699,854 A | 10/1987 | Snyder |
| 4,720,439 A | 1/1988 | Hruden |
| 4,725,514 A | 2/1988 | Hruden |
| 4,803,135 A | 2/1989 | Garoutte |
| 4,925,750 A | 5/1990 | Theiss |
| 5,196,276 A | 3/1993 | Niksa |

* cited by examiner

*Primary Examiner* — Carlos Barcena
(74) *Attorney, Agent, or Firm* — Neustel Law Offices

(57) ABSTRACT

A reserve battery that is activated via a low energy mechanical force. The reserve battery generally includes a battery case having an electrolyte compartment at a first end and an electrode compartment at a second end, a first terminal having an external button connected to the case at the first end, and a second terminal connected to the case at the second end. A movable ampoule is movably positioned within the electrolyte compartment. A bias member is located within the case between the external button and the ampoule and a porous cutter is positioned within the case between the electrodes and the ampoule and supported by an inverted U-shaped support structure. When an external force is applied to the external button, the bias member transfers an internal force to the ampoule to cause the ampoule to engage the cutter and allow the electrolyte to release thus activating the battery.

20 Claims, 4 Drawing Sheets

RESERVE BATTERY SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a battery and more specifically it relates to a reserve battery system that is easily activated via a low energy mechanical force thus allowing the reserve battery to be used in a wide variety of consumer related and non consumer related electrical devices.

2. Description of the Related Art

Any discussion of the related art throughout the specification should in no way be considered as an admission that such related art is widely known or forms part of common general knowledge in the field.

Reserve batteries have been around for many years and are generally used as specialty batteries which have a very long shelf life for military applications, wherein the shelf life refers to the period prior to usage of the battery power. In many instances, reserve batteries have been large, bulky, heavy and expensive to build, and contain large areas of wasted space due to mechanical separators (which require a large force, such as a hammer or explosion, to break in order for activation).

For these reasons, the production and use of reserve batteries has generally been less than optimal and also has been restricted to the military or large organizations. Because of the inherent problems with the related art, there is a need for a new and improved reserve battery system that is easily activated via a low energy mechanical force thus allowing the reserve battery to be used in a wide variety of consumer related and non consumer related electrical devices.

BRIEF SUMMARY OF THE INVENTION

A battery system that is easily activated via a low energy mechanical force thus allowing the reserve battery to be used in a wide variety of consumer related and non consumer related electrical devices. The invention generally relates to a reserve battery which includes a battery case having an electrolyte compartment at a first end and an electrode compartment at a second end, a first terminal having an external button connected to the case at the first end, and a second terminal connected to the case at the second end. A movable ampoule is movably positioned within the electrolyte compartment. A bias member is located within the case between the external button and the ampoule and a porous cutter is positioned within the case between the electrodes and the ampoule and supported by an inverted U-shaped support structure. When an external force is applied to the external button, the bias member transfers an internal force to the ampoule to cause the ampoule to engage the cutter and allow the electrolyte to release thus activating the battery.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
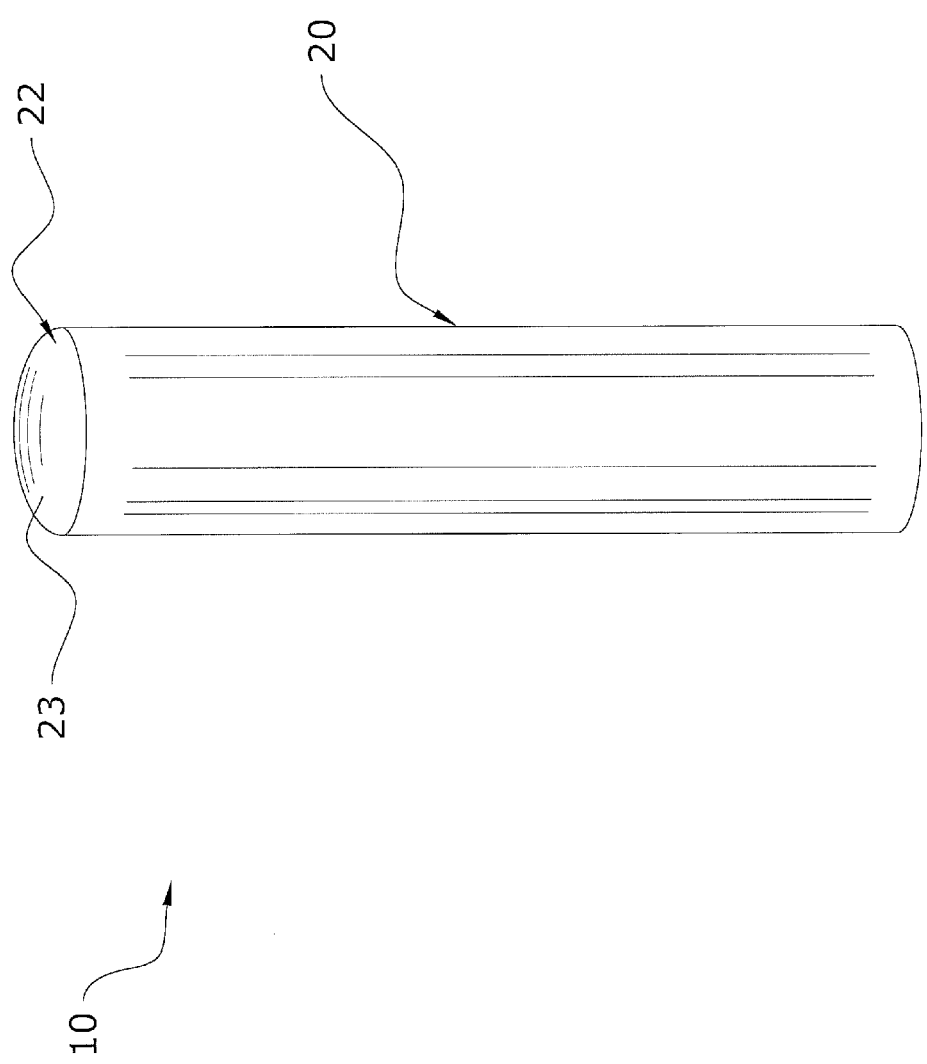
FIG. 1 is an exemplary upper perspective view of the present invention.
Figure 2:
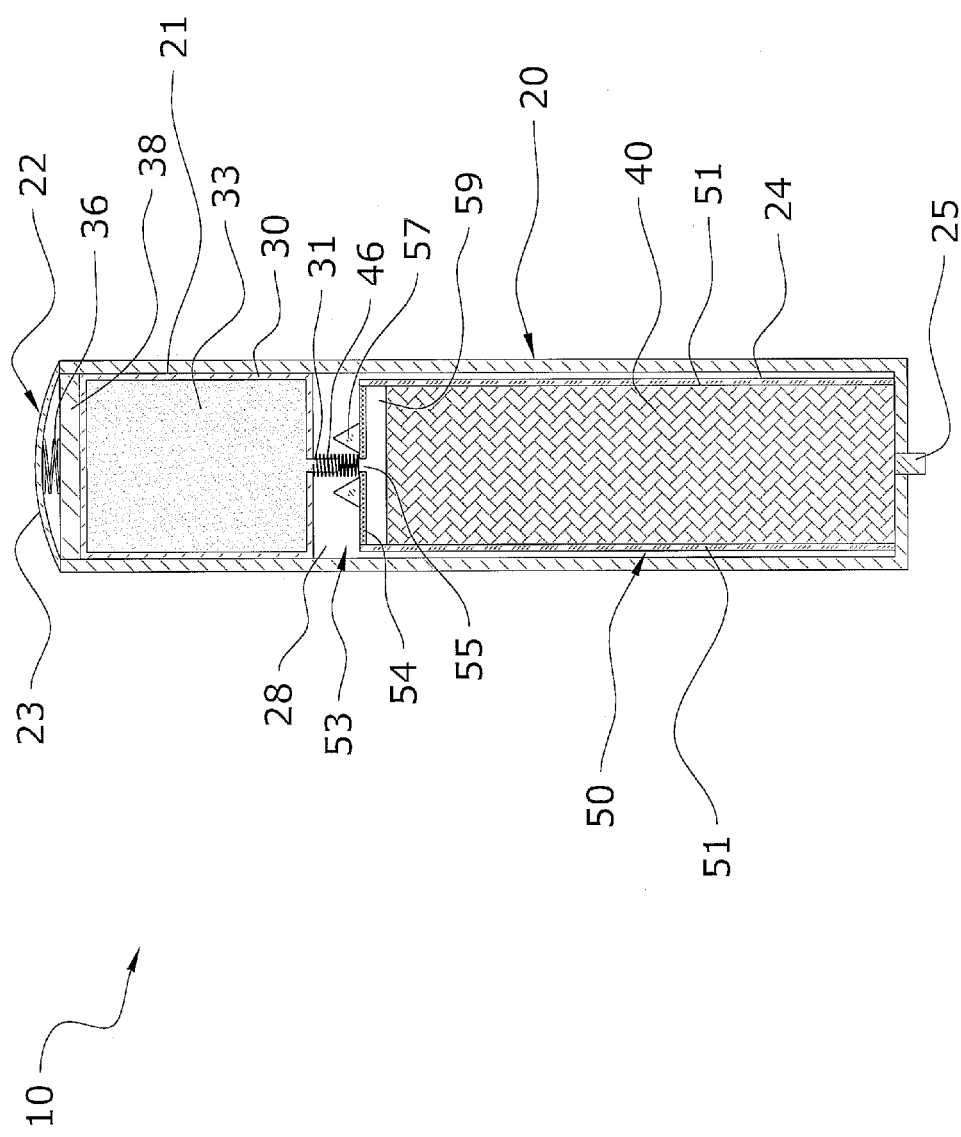
FIG. 2 is a side sectional view of a preferred embodiment of the present invention illustrating the battery in a non activated state and the external button in an initial position.
Figure 3:
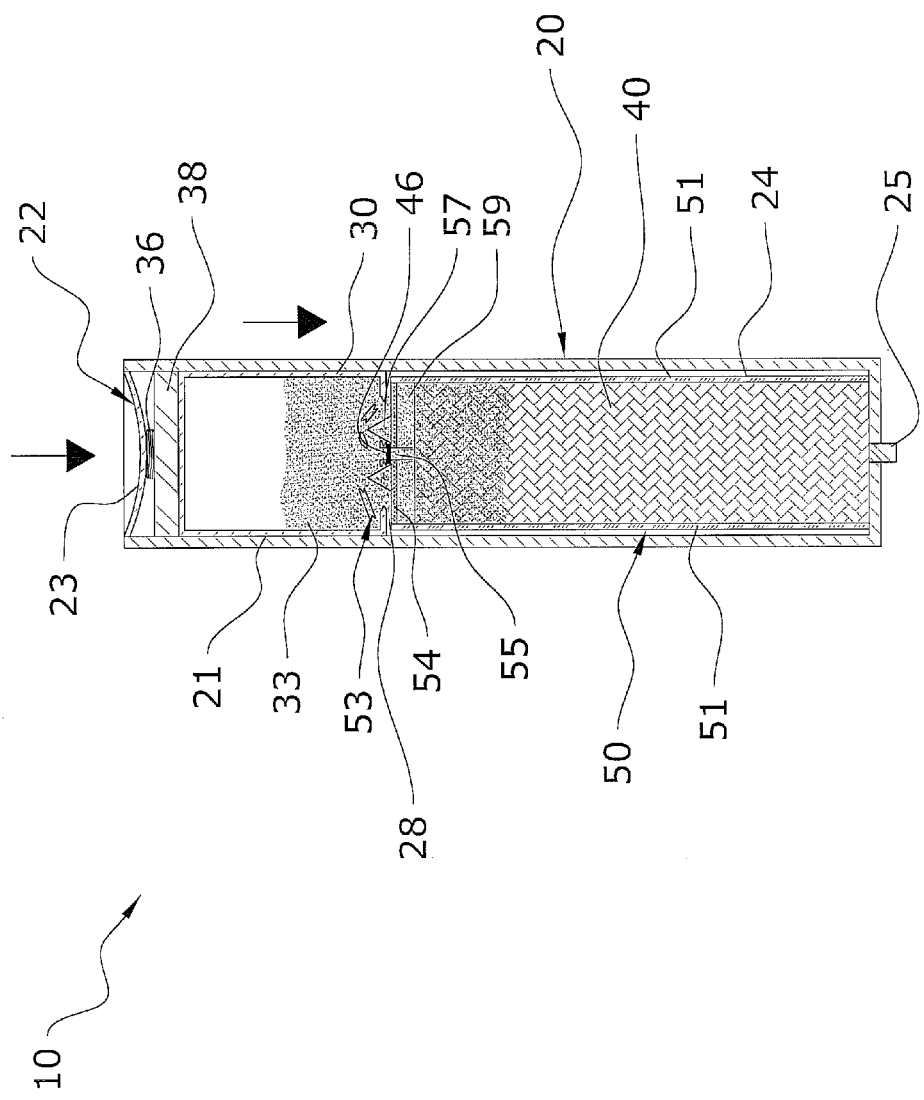
FIG. 3 is a side sectional view of the preferred embodiment of the present invention illustrating the battery being activated by depressing the external button to move the ampoule in contact with the cutter.
Figure 4:
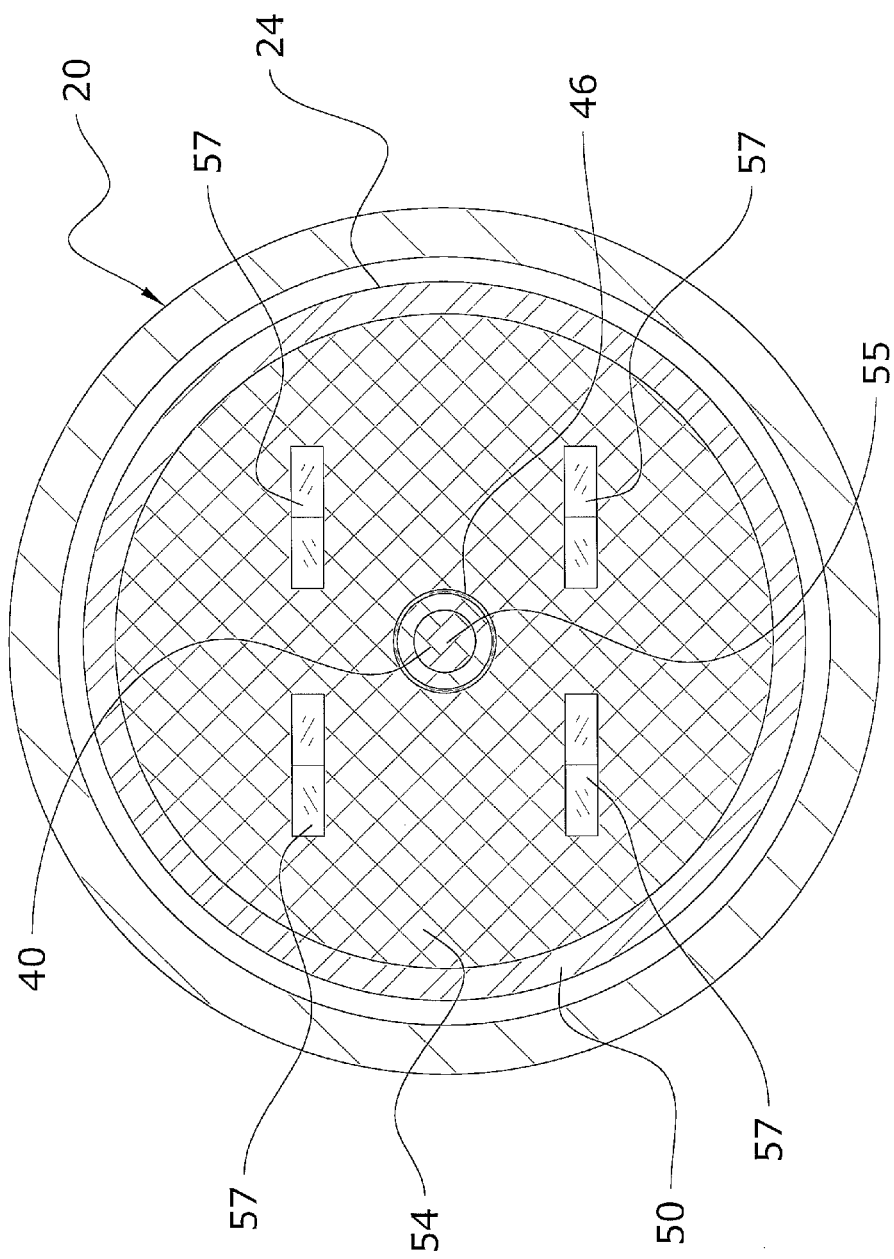
FIG. 4 is a top sectional view illustrating the symmetrical pattern of the jagged members of the cutter and the porous plate of the cutter.

A. Overview.

Turning now descriptively to the drawings, in which similar reference characters denote similar elements throughout the several views, FIGS. 1 through 4 illustrate a reserve battery system 10, which comprises a battery case 20 having an electrolyte compartment 21 at a first end and an electrode compartment 24 at a second end, a first terminal 22 having an external button 23 connected to the case at the first end, and a second terminal 25 connected to the case at the second end. A movable ampoule 30 is movably positioned within the electrolyte compartment 21. A bias member 36 is located within the case between the external button 23 and the ampoule 30 and a porous cutter 53 is positioned within the case between the electrodes 40 and the ampoule 30 and supported by an inverted U-shaped support structure 50.

When an external force is applied to the external button 23, the bias member 36 transfers an internal force to the ampoule 30 to cause the ampoule 30 to engage the cutter 53 and allow the electrolyte 33 to release thus activating the battery 10. Generally one of the terminals 22, 25, is formed from the battery case 20 while the other terminals 22, 25, is attached to an electrically isolated cap fitted onto the battery case 20. A gap 28 separates the electrolyte compartment 21 from the electrode compartment 24, wherein the cutter 53 rests within the gap 28 during a non activated state of the battery 10.

B. Battery Case.

The battery case 20 may be comprised of various sizes and shapes to mimic conventional or new battery case 20 sizes. In the preferred embodiment, the battery case 20 resembles that of a conventional 18650 battery casing as illustrated in FIG. 1; however other sizes may be appreciated. The battery case 20 may be comprised of various materials; all of which are able to contain the electrolyte 33 and prevent leakage over prolonged periods. The battery case 20 is generally rigid in structure except for the external button 23. The battery case 20 may be large enough to enclose multiple cells for large size batteries or may be small enough to simply enclose a single cell in small size batteries.

The battery case 20 generally includes an electrolyte compartment 21 and an electrode compartment 24. The electrolyte compartment 21 and the electrode compartment 24 are generally longitudinally spaced apart within the interior of the battery case 20 and act to hermetically seal the electrolyte 33 positioned within the electrolyte compartment 21 from the electrodes 40 positioned within the electrode compartment 24 while the battery 10 is in the reserve state.

The battery case 20 also generally includes a first terminal 22 extending from a first end generally adjacent the electrolyte compartment 21 and a second terminal 25 extending from a second end generally adjacent the electrode compartment 24. The first terminal 22 and the second terminal 25 are thus generally positioned upon opposing ends of the battery case 20; however other configurations may be appreciated.

The first terminal 22 is generally substantially flush along the outer end of the battery case 20, thus forming the negative contact for the battery 10. The second terminal 25 is generally comprised of an outwardly protruding pin thus forming the positive contact for the battery 10.

The first terminal 22 also generally comprises an external button 23 that may be depressed from an external side of the battery case 20 to activate the battery 10. The external button 23 is preferably integral with the first terminal 22 and is generally resilient, flexible, or otherwise malleable in structure and material to allow an operator to apply a low mechanical force thereto, such as by pushing, etc., to activate the battery 10.

The first terminal 22 and external button 23 may form a convex shape along the end of the battery case 20 to allow for the button 23 to be easily pushed inwards. It is appreciated that the external button 23 and the first terminal 22 may be comprised of an integral one-piece structure or a separate external button 23 may extend from or be connected to the first terminal 22 in alternate embodiments. The first terminal 22 and external button 23 may further be integrally formed with the battery case 20 or may be comprised of a separate structure affixed thereto.

C. Electrolyte Compartment.

As stated previously, the electrolyte compartment 21 is generally located at an internal longitudinal end of the battery case 20. Positioned within the electrolyte compartment 21 is an ampoule 30 which is suited to hold the electrolyte 33. The ampoule 30 may be formed by the interior walls of the battery case 20 or may be comprised of a separate ampoule 30 positioned within the electrolyte compartment 21 of the battery case 20. Further, the electrolyte compartment 21 may be separately defined within the battery case 20 or may be simply the generally area in which the ampoule 30 is located.

In the preferred embodiment, the ampoule 30 is generally comprised of a cylindrical shape and may have a neck or fill port 31, generally fused shut, extending towards the electrode compartment 24 in which the second bias member 46 may be centered around. The fill port 31 may stabilize and guide the ampoule 30 as the ampoule 30 is being pushed through the battery case 20 towards the electrodes 40. The ampoule 30 is movable within the battery case 20 along a longitudinal axis to move towards the electrodes 40 when pressure is applied to the external button 23. A movable spacer 38 is also preferably located at an upper end of the ampoule 30 to provide a barrier or support between the ampoule 30 and the first bias member 36. The movable spacer 38 generally moves with the ampoule 30 when pressure is applied to the first bias member 36. The spacer 38 may the transfer electrical conductivity to the first terminal 22 or may provide electrical isolation.

The ampoule 30 is preferably comprised of a metal material. Some benefits of using a metal ampoule 30 include a simplified production of the ampoule 30, simplified design, being able to use thinner walls upon the ampoule 30 and square corners, direct connection to the first terminal 22, and integral construction with the associated end of the battery case 20. Using the metal ampoule 30, the fill port 31 can be sealed via resistive welding, solder, etc. The fill port 31 can also be substantially narrow, wherein the metal ampoule 30 can be evacuated to a hard vacuum prior to filling with the electrolyte 33. Alternately, the ampoule 30 may be comprised of a glass material.

D. Electrode Compartment.

As stated previously, the electrode compartment 24 is generally located at an internal longitudinal end of the battery case 20 opposite the electrolyte compartment 21. Positioned within the electrode compartment 24 are electrodes 40. The electrodes 40 may extend from the interior walls of the battery case 20 or may be enclosed within a separate container within the electrode compartment 24 of the battery case 20. Further, the electrode compartment 24 may be separately defined within the battery case 20 or may be simply the generally area in which the electrodes 40 are located. The electrodes 40 may be comprised of a rolled electrode 40 stack.

E. First Bias Member.

The first bias member 36 is located internal to the battery case 20 and in contact with the first terminal 22 and external button 23 adjacent the electrolyte compartment 21 opposite the electrode compartment 24. The first bias member 36 allows for slight give in the position of the ampoule 30 relative the battery case 20 to prevent the ampoule 30 from rupturing when unintended. The first bias member 36 also stores and releases energy to transfer a force to the ampoule 30 rod when an external force is applied to the external button 23 of the first terminal 22. In the preferred embodiment, the first bias member 36 is positioned between the external button 23 and the movable spacer 38 that is positioned directly above the ampoule 30 opposite the electrodes 40.

The first bias member 36 is preferably comprised of a compression spring and is able to be guided smoothly back and forth along a definite path within the battery case 20 when the external force is applied to the external button 23. It is appreciated that other biasing structures may be used in alternate embodiments.

F. Support Structure.

The support structure 50 is positioned within the battery case 20 and generally extends around the electrodes 40 within the electrode compartment 24. The support structure 50 also supports the cutter 53 in a fixed position between the electrodes 40 and the ampoule 30 containing the electrolyte 33. The support structure 50 is also fixed in position.

In the preferred embodiment, the support structure 50 includes sidewalls 51 lining the interior walls of the battery case 20, wherein the sidewalls may have a circular cross-section to define a cavity 59 to contain the electrodes 40 therein. Extending across the support structure 50 at an upper end is preferably a porous plate 54 to allow the electrolyte 33 to travel therethrough when released from the ampoule 30 to contact the electrodes 40. The porous plate 54 is thus generally positioned above the electrodes 40 and below the ampoule 30. The porous plate 54 may be circular in shape or be comprised of various other shapes.

The porous plate 54 may also have a concentric opening 55 extending therethrough to receive the electrolyte 33 material and/or the fill port 31 of the ampoule 30. A cutter 53 is also formed with the porous plate 54 and preferably includes a plurality of jagged members 57 extending upwardly towards the ampoule 30 therefrom. The jagged members 57 of the cutter 53 are utilized to assist in rupturing the ampoule 30.

The jagged members 57 are preferably symmetrical upon the porous plate 54 and may form a sharp-pointed triangular structure among other shapes (e.g. including a jagged member 57 at each corner of the porous plate 54). Different configurations may also be utilized depending on cost of materials and ease of production.

G. Second Bias Member.

A second bias member 46 may be utilized to provide an upward force upon the ampoule 30 to help prevent accidental engagement with the cutter 53. The second bias member 46 is generally positioned between the base 32 of the ampoule 30 and the porous plate 54. The second bias member 46 is concentric with the fill port 31 and preferably surrounds the fill port 31. The second bias member 46 may also be used to return the ampoule 30 to an initial position when pressure is not being placed upon the external button 23, wherein the force of the second bias member 46 is generally greater than the force of the first bias member 36 to maintain the ampoule 30 away from the cutter 53 when no pressure is applied upon the external button 23.

When pressure is applied upon the external button 23 to compress the first bias member 36, the second bias member 46 is also forced to compress thus allowing the ampoule 30 to lower or move towards the cutter 53. It is appreciated that the pressure applied to the external button 23 need only be greater than the first bias member 36 and the second bias member 46 and/or the second bias member 46. The second bias member 46 is preferably comprised of a compression spring and is able to be guided smoothly back and forth along a definite path via the fill port 31 when the external force is applied to the external button 23. It is appreciated that other biasing structures may be used in alternate embodiments.

H. Operation of Preferred Embodiment.

In use, a low energy mechanical force, such as hand-applied pressure, is externally applied to the external button 23 of the first terminal 22 to push the first terminal 22 and external button 23 inwardly within the internal space of the battery case 20. As the second terminal 25 and external button 23 move inwardly the internal side pushes on the first bias member 36 causing the bias member to compress and push on the ampoule 30. The ampoule 30 moves toward the cutter 53 either against a biasing force from the second bias member 46.

The base 32 of the ampoule 30 comes in contact with the cutter 53 and ruptures which subsequently causes the ampoule 30 to release the electrolyte 33. As the fill port 31 is forced further downwards toward the electrodes 40, the fill port 31 is guided through the opening 55 of the porous plate 54 of the cutter 53 and enters the cavity 59 defined by the support structure 50. The bias member 46 is also stabilized by the fill port 31.

The electrolyte 33 is allowed to come in contact with the electrodes 40 creating a chemical reaction which results in a voltage which is transferred to the first terminal 22 and the second terminal 25 via various internal electrical conductors to power a connected electrical device. The battery 10 may be used in various consumer or commercial electrical devices and may be comprised of various sizes.

When pressure is released from the external button 23, the second bias member 46 return the ampoule 30 back to an initial position. The springing back movement of the ampoule 30 may also assist in transferring the electrolyte 33 from within the ampoule 30 to the electrodes 40 by providing a wicking motion of the ampoule 30.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A reserve battery, comprising:
   a battery case having an electrolyte compartment and an electrode compartment;
   wherein said electrolyte compartment is adjacent a first end and said electrode compartment is adjacent a second end;
   a first battery terminal connected to said battery case at said first end, wherein said first battery terminal comprises an external button;
   a second battery terminal connected to said battery case at said second end;
   an ampoule movably positioned within said electrolyte compartment;
   an electrolyte contained within said ampoule;
   a first bias member internally located within said battery case between said external button of said first terminal and said electrolyte compartment opposite said electrode compartment;
   electrodes positioned within said electrode compartment;
   a porous cutter supported within said battery case between said electrodes of said electrode compartment and said ampoule of said electrolyte compartment;
   wherein an external force applied to said external button of said first terminal causes said first bias member to transfer an internal force to said ampoule to cause said ampoule to rupture via engagement with said cutter thus allowing said electrolyte to release and contact said electrodes thus activating said battery.

2. The reserve battery of claim 1, including a support structure positioned within said battery case for supporting said cutter in a fixed position.

3. The reserve battery of claim 2, wherein said support structure surrounds said electrodes.

4. The reserve battery of claim 3, wherein said support structure is comprised of a pair of sidewalls and an upper porous plate, wherein said pair of sidewalls line an interior side of said battery case.

5. The reserve battery of claim 4, wherein said support structure is comprised of an inverted U-shaped structure.

6. The reserve batter of claim 1, wherein said first bias member is comprised of a compression spring.

7. The reserve battery of claim 1, including a second bias member positioned between said cutter and said ampoule for providing an opposing bias force upon said ampoule as said first bias member.

8. The reserve battery of claim 7, wherein a first biasing force of said first bias member is less or equal to a second biasing force of said second bias member.

9. The reserve battery of claim 8, wherein said second bias member is comprised of a compression spring.

10. The reserve battery of claim 1, wherein said external button has a convex shape.

11. The reserve battery of claim 1, wherein said cutter includes a plurality of jagged members extending towards said ampoule.

12. The reserve battery of claim 11, wherein said plurality of jagged members are symmetrically positioned upon a porous plate of said cutter.

13. The reserve battery of claim 1, wherein said ampoule is comprised of a metal material.

14. A reserve battery, comprising:
a battery case having an electrolyte compartment and an electrode compartment;
wherein said electrolyte compartment is adjacent a first end and said electrode compartment is adjacent a second end;
a first battery terminal connected to said battery case at said first end, wherein said first battery terminal comprises an external button;
a second battery terminal connected to said battery case at said second end;
an ampoule movably positioned within said electrolyte compartment;
an electrolyte contained within said ampoule;
a first bias member internally located within said battery case between said external button of said first terminal and said electrolyte compartment opposite said electrode compartment;
electrodes positioned within said electrode compartment;
a support structure positioned within said battery case and at least partially surrounding said electrodes;
wherein said support structure is comprised of a pair of sidewalls and an upper porous plate;
wherein said pair of sidewalls line an interior side of said battery case around said electrodes and wherein said porous plate is positioned above said electrodes to define an inverted U-shaped structure;
a plurality of jagged members extending from said porous plate towards said ampoule of said electrolyte compartment;
wherein an external force applied to said external button of said first terminal causes said first bias member to transfer an internal force to said ampoule to cause said ampoule to rupture via engagement with said plurality of jagged members thus allowing said electrolyte to release and contact said electrodes thus activating said battery.

15. The reserve battery of claim 14, wherein said plurality of jagged members are symmetrically positioned upon a porous plate of said cutter.

16. The reserve batter of claim 14, wherein said first bias member is comprised of a compression spring.

17. The reserve battery of claim 14, including a second bias member positioned between said cutter and said ampoule for providing an opposing bias force upon said ampoule as said first bias member.

18. The reserve battery of claim 17, wherein a first biasing force of said first bias member is less or equal to a second biasing force of said second bias member.

19. The reserve battery of claim 18, wherein said second bias member is comprised of a compression spring.

20. A reserve battery, comprising:
a battery case having an electrolyte compartment and an electrode compartment;
wherein said electrolyte compartment is adjacent a first end and said electrode compartment is adjacent a second end;
a first battery terminal connected to said battery case at said first end, wherein said first battery terminal comprises an external button;
wherein said external button has a convex shape;
a second battery terminal connected to said battery case at said second end;
an ampoule movably positioned within said electrolyte compartment;
wherein said ampoule is comprised of a metal material;
wherein said ampoule has a fill port extending from a base of said ampoule;
an electrolyte contained within said ampoule;
a first bias member internally located within said battery case between said external button of said first terminal and said electrolyte compartment opposite said electrode compartment;
wherein said first bias member is comprised of a compression spring;
electrodes positioned within said electrode compartment;
a support structure positioned within said battery case and at least partially surrounding said electrodes;
wherein said support structure is comprised of a pair of sidewalls and an upper porous plate;
wherein said pair of sidewalls line an interior side of said battery case around said electrodes and wherein said porous plate is positioned above said electrodes to define an inverted U-shaped structure;
a plurality of jagged members extending from said porous plate towards said ampoule of said electrolyte compartment;
wherein said porous plate has an opening extending therethrough;
wherein said opening leads to a cavity defined by said support structure;
a second bias member positioned between said cutter and said ampoule for providing an opposing bias force upon said ampoule as said first bias member;
wherein said second bias member surrounds said fill port;
wherein said fill port is guided through said opening of said porous plate;
wherein a first biasing force of said first bias member is less or equal to a second biasing force of said second bias member;
wherein said second bias member is comprised of a compression spring;
wherein an external force applied to said external button of said first terminal causes said first bias member to transfer an internal force to said ampoule to cause said base of said ampoule to rupture via engagement with said plurality of jagged members thus allowing said electrolyte to release and contact said electrodes thus activating said battery.

* * * * *